US008982850B2

(12) United States Patent
Zhang et al.

(10) Patent No.: US 8,982,850 B2
(45) **Date of Patent: *Mar. 17, 2015**

(54) CYCLIC SHIFT DELAYS IN MULTI-USER PACKETS WITH RESOLVABLE VERY HIGH THROUGHPUT LONG TRAINING FIELDS (VHTLTFS)

(71) Applicant: Marvell World Trade Ltd., St. Michael (BB)

(72) Inventors: Hongyuan Zhang, Fremont, CA (US); Sudhir Srinivasa, Campbell, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/032,656

(22) Filed: Sep. 20, 2013

(65) Prior Publication Data

US 2014/0023092 A1 Jan. 23, 2014

Related U.S. Application Data

(63) Continuation of application No. 13/177,236, filed on Jul. 6, 2011, now Pat. No. 8,542,659.

(60) Provisional application No. 61/362,246, filed on Jul. 7, 2010.

(51) Int. Cl.

| | |
|---|---|
| ***H04Q 7/00*** | (2006.01) |
| ***H04L 27/26*** | (2006.01) |
| ***H04B 7/06*** | (2006.01) |

(52) U.S. Cl.

CPC .......... *H04L 27/2607* (2013.01); *H04B 7/0671* (2013.01); *H04L 27/261* (2013.01)

USPC ............................ 370/334; 370/328; 370/210

(58) Field of Classification Search

None

See application file for complete search history.

(56) References Cited

U.S. PATENT DOCUMENTS

| | | | | |
|---|---|---|---|---|
| 7,855,993 | B2 | 12/2010 | Mujtaba | |
| 8,542,659 | B2 * | 9/2013 | Zhang et al. | 370/338 |
| 8,717,865 | B2 * | 5/2014 | Yang et al. | 370/203 |
| 2007/0047666 | A1 | 3/2007 | Trachewsky | |
| 2010/0046358 | A1 | 2/2010 | van Nee | |
| 2010/0074362 | A1 | 3/2010 | Lim et al. | |
| 2010/0189167 | A1 * | 7/2010 | Pare et al. | 375/219 |
| 2011/0305178 | A1 | 12/2011 | Zheng et al. | |

(Continued)

OTHER PUBLICATIONS 802.11n, IEEE Standard for Information Technology—Telecommunications and information exchange between systems—Local and metropolitan area networks—Specific requirements Part 11: Wireless LAN Medium Access Control (MAC) and Physical Layer (PHY) Specifications Amendment 5: Enhancements for High Throughput, Oct. 29, 2009; 535 pages.

(Continued)

*Primary Examiner* — Duc C Ho

(57) ABSTRACT

A system including a stream generator module to generate a plurality of streams to be transmitted in a packet. The packet is to be transmitted to a plurality of client stations. First streams are designated for a first client station and include a plurality of training fields. Second streams are designated for a second client station and include the plurality of training fields. A cyclic shift delay module applies a plurality of cyclic shift delay values to the plurality of streams. First values from the plurality of cyclic shift delay values are respectively applied to the first streams. Second values from the plurality of cyclic shift delay values are respectively applied to the second streams. A mapping module spatially maps the plurality of streams subsequent to the cyclic shift delay module applying the cyclic shift delay values to the plurality of streams.

18 Claims, 5 Drawing Sheets

(56) References Cited

U.S. PATENT DOCUMENTS

2012/0224570 A1 9/2012 Seok et al.
2013/0315330 A1 * 11/2013 Yamaura ...................... 375/267

OTHER PUBLICATIONS

International Search Report and Written Opinion of the International Searching Authority for corresponding International Application No. PCT/US2011/043134, mailed Nov. 2, 2011; 11 Pages.

IEEE: Specification Framework for Tgac, [Online] May 18, 2010, retrieved from the Internet: https://mentor.ieee.org/802.11/dcn/09/11-09-00ac-proposed-specification-framework-for-tgac.doc, pa; pp. 1-10.

Syafei et al., "A Gigabit MIMO WLAN System with International Standardization Strategy," Intelligent Signal Processing and Communication Systems, International Symposium on IEEE, Dec. 7, 2009; 4 Pages.

* cited by examiner

| $N_{sts,total}$ | $N_{VHTLTF}$ |
|---|---|
| 1 | 1 |
| 2 | 2 |
| 3 | 4 |
| 4 | 4 |
| 5 | 6 |
| 6 | 6 |
| 7 | 8 |
| 8 | 8 |

| Total number of space-time streams $N_{sts,total}$ | Cyclic shift delay for space-time stream n (ns) | | | | | | | |
|---|---|---|---|---|---|---|---|---|
| | 1 | 2 | 3 | 4 | 5 | 6 | 7 | 8 |
| 1 | 0 | - | - | - | - | - | - | - |
| 2 | 0 | -400 | - | - | - | - | - | - |
| 3 | 0 | -400 | -200 | - | - | - | - | - |
| 4 | 0 | -400 | -200 | -600 | - | - | - | - |
| 5 | 0 | -400 | -200 | -600 | -350 | - | - | - |
| 6 | 0 | -400 | -200 | -600 | -350 | -650 | - | - |
| 7 | 0 | -400 | -200 | -600 | -350 | -650 | -100 | - |
| 8 | 0 | -400 | -200 | -600 | -350 | -650 | -100 | -750 |

FIG. 3C

CYCLIC SHIFT DELAYS IN MULTI-USER PACKETS WITH RESOLVABLE VERY HIGH THROUGHPUT LONG TRAINING FIELDS (VHTLTFS)

CROSS-REFERENCE TO RELATED APPLICATIONS

This is a continuation of U.S. patent Ser. No. 13/177,236, filed on Jul. 6, 2011, which claims the benefit of U.S. Provisional Application No. 61/362,246, filed on Jul. 7, 2010. The entire disclosures of the above applications are incorporated herein by reference.

FIELD

The present disclosure relates generally to wireless communication systems and more particularly to applying cyclic shift delays (CSDs) in multi-user packets with resolvable very high throughput long training fields (VHTLTFs).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a multi-user (MU) multiple-input multiple-output (MIMO) wireless communication system 100 is shown. The system 100 includes a base station (BS) 102 and multiple client stations STA1 104-1, . . . , and STAn 104-*n* (collectively STAs 104), where n is an integer greater than 1. The BS 102 and the STAs 104 each can have a plurality of antennas. For example, the BS 102 can have four antennas, and each of the STAs 104 can have two antennas. The BS 102 transmits data to the STAs 104 in streams. For example, the BS 102 may modulate the data using orthogonal frequency-division multiplexing (OFDM) according to one or more standards set forth by the Institute of Electrical and Electronics Engineers.

SUMMARY

A system including a training field generator module, a stream generator module, and a cyclic shift delay module. The training field generator module generates training fields to be transmitted in a packet to client stations. The stream generator module generates streams to be transmitted in the packet. First streams (i) are designated for a first client station and (ii) include the training fields. Second streams (i) are designated for a second client station and (ii) include the training fields. The cyclic shift delay module applies cyclic shift delay values to the streams. First cyclic shift delay values are respectively applied to the first streams. Second cyclic shift delay values are respectively applied to the second streams. At least one of the second cyclic shift delay values is equal to one of the first cyclic shift delay values. Alternatively, the second values are different than the first values.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 3C depicts a table showing cyclic shift delay values for very high throughput (VHT) portion of a multi-user (MU) packet according to the present disclosure;

DESCRIPTION

Figure 1:
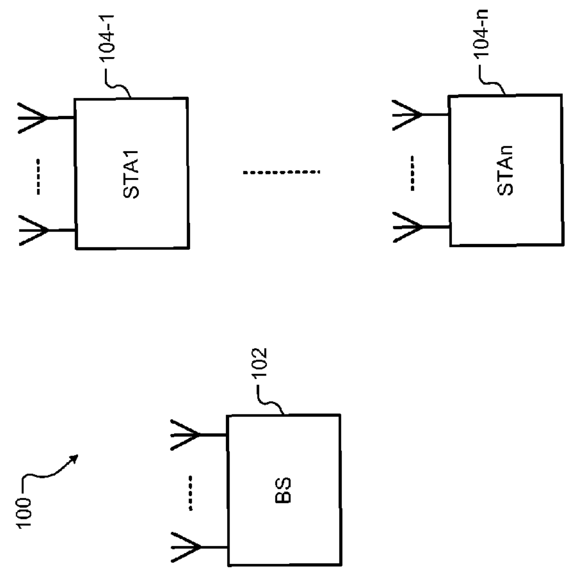
FIG. 1 is a functional block diagram of a multi-user (MU) multiple-input multiple-output (MIMO) wireless communication system.
Figure 2:
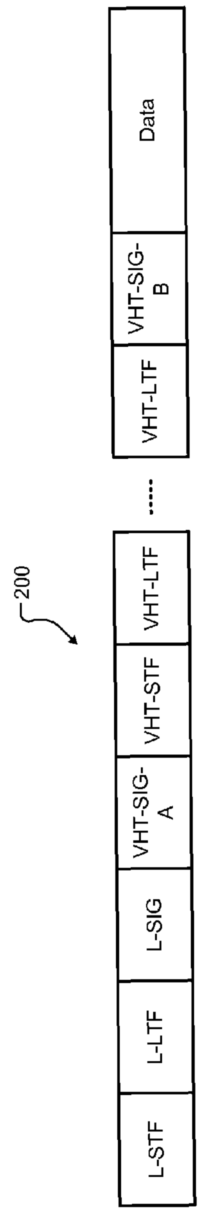
FIG. 2 depicts a format of a very high throughput (VHT) multi-user (MU) packet transmitted from a base station (BS) to multiple client stations (STAs) in a MIMO downlink transmission according to the present disclosure.

FIG. 2 illustrates a format of a very high throughput (VHT) multi-user (MU) packet 200 according to one implementation of the present disclosure. The packet 200 is transmitted from a base station (BS) to multiple client stations (STAs) in a multi-user (MU) multiple-input multiple-output (MIMO) downlink transmission. The packet 200 is called a VHT physical layer convergence procedure (PLCP) protocol data unit (PPDU). The VHT PPDU 200 includes a VHT preamble and data (payload). The VHT preamble includes a plurality of preamble fields used by the STAs to estimate channel as explained below in detail.

The preamble fields include a non high throughput (non-HT) short training field (L-STF), a non-HT long training field (L-LTF), a non-HT signal field (L-SIG), a VHT signal field A (VHT-SIG-A), a VHT short training field (VHT-STF), a plurality of VHT long training fields (VHT-LTFs), and a VHT signal field B (VHT-SIG-B). VHT-SIG-A, VHT-STF, VHT-LTFs, and VHT-SIG-B are transmitted only in VHT packets. The number of VHT-LTFs ($N_{VHTLTF}$) can be 1, 2, 4, 6, or 8 and is determined by the total number of space-time streams across all users being transmitted in a frame.

In multi-user (MU) MIMO downlink transmissions, streams of data transmitted from a base station (BS) to multiple client stations (STAs) should be spatially separated to avoid multi-user interference at the STAs. For example, the BS can spatially separate the streams based on channel state information (CSI) feedback received from the STAs. The CSI feedback, however, can be imperfect due to factors including non-idealities at the STAs, finite capacity of feedback channel, channel aging, and so on. Streams transmitted based on imperfect CSI feedback can cause interference at one or more STAs.

Some STAs can have more receive antennas than the number of streams received by the STAs. The STAs can use the additional receive antennas to suppress interference. To suppress interference, however, the STAs need to know the entire channel across the streams of all the users. To allow the STAs to acquire knowledge of the entire channel, the BS can transmit multiple very high throughput long training fields (VHTLTFs) to train the total number of streams transmitted on the downlink. The VHTLTFs that allow a STA to estimate channel of signals designated for the STA as well as channel of interference signals at the STA are called resolvable VHTLTFs. In contrast, LTFs that train only the streams that are designated for the STA are called unresolvable LTFs. Multi-user (MU) packets can include either resolvable or unresolvable VHTLTFs.

For example, consider a base station (BS) having four transmit antennas transmitting a downlink packet to four STAs each having two receive antennas, where each user receives a single stream of data. When unresolvable LTFs are used, the BS spatially separates the LTFs of the four users and transmits one VHTLTF per user. Instead, when resolvable LTFs are used, the BS transmits four LTFs per user (i.e., per STA). The four LTFs received by each STA allow each STA to estimate the channel across all the four streams and suppress interference caused by streams designated for other STAs using the second receive antenna.

The present disclosure relates to reducing interference by applying different cyclic shift delays (CSDs) to different space-time streams transmitted by the base station (BS) in MIMO downlink transmissions. Specifically, different CSDs are applied to different space-time streams before spatially mapping the space-time streams at the BS. The CSDs applied to the space-time streams in this manner can mitigate unintentional beamforming when similar signals are transmitted in different space-time streams by the BS. The cyclic shift delay applied during transmission of VHT portion of the VHT preamble of a frame is also applied during transmission of data portion (i.e., payload) of the frame. Accordingly, STAs that receive the frame can use the channel estimate generated based on the VHT preamble of the frame to correctly demodulate and decode the data (i.e., payload) in the frame. The present disclosure is intended for resolvable VHTLTFs.

According to the present disclosure, single user (SU) packets transmitted by a base station (BS) can support up to 8 space-time streams, and multi-user (MU) downlink packets can support up to 4 or 8 space-time streams per user with up to 8 space-time streams across all users, where the limit of 8 space-time streams is according to the 802.11ac standard set forth by the Institute of Electrical and Electronic Engineers. In MU downlink packets, different CSD values can be applied to the space-time streams, where the actual values of the CSDs can depend on the number of space-time streams. The present disclosure, however, is transparent to the actual values of the CSDs. That is, the present disclosure applies the CSDs to the space-time streams without regard to the actual values of the CSDs. Specifically, the present disclosure provides two different approaches for applying CSDs to the space-time streams in multi-user (MU) packets with resolvable VHTLTFs.

According to a first approach, CSD values are reset when moving from one user to another. In other words, the same CSD values are applied to streams of each user as if there is only a single user. For example, suppose there are two users (STA1 and STA2), and four streams (S1, S2, S3, and S4), where each user has two streams each. For the user STA1, a CSD value CSD1 is applied to stream S1, and a CSD value CSD2 is applied to stream S2. Subsequently, for the user STA2, the CSD values are reset, and the same CSD values CSD1 and CSD2, which were applied to streams S1 and S2, are respectively applied to streams S3 and S4.

In general, suppose the base station (BS) transmits $N_{sts}^{u1}$ streams to STA1 and $N_{sts}^{u2}$ streams to STA2, where $N_{sts}^{u1}$ and $N_{sts}^{u2}$ denote number of streams for user 1 (STA1) and user 2 (STA2), respectively, and where $N_{sts}^{u1}$ and $N_{sts}^{u2}$ are integers greater than or equal to 1. For STA1, CSD values (CSD(0), CSD(1), . . . , and CSD($N_{sts}^{u1}-1$)) are applied to the $N_{sts}^{u1}$ streams. Subsequently, the CSD values are reset for every user in a VHTLTF sequence. For example, for STA2, the CSD values restart from CSD(0), and CSD values (CSD(0), CSD (1), . . . , and CSD($N_{sts}^{u2}-1$)) are applied to the $N_{sts}^{u2}$ streams.

Mathematically, consider a two-user multi-user (MU) packet. The resolvable VHTLTFs on the $k^{th}$ subcarrier can be expressed as $$VHTLTF_k = [L_{k,1}, L_{k,2}, \ldots , L_{k,N_{LTF}}] = [Q_{k,1}, Q_{k,2}]\begin{bmatrix} D_{k,1} & 0 \\ 0 & D_{k,2} \end{bmatrix}\begin{bmatrix} P_{1*} \\ P_{2*} \end{bmatrix}s^{(k)}$$

where $L_{k,1}$ is VHTLTF for $k^{th}$ subcarrier for user 1 (STA1), $L_{k,2}$ is VHTLTF for the $k^{th}$ subcarrier for user 2 (STA2), and so on. $N_{LTF}$ is the number of LTFs required to train the streams of all the users. $Q_{k,1}$ and $Q_{k,2}$ are elements of a spatial mapping matrix Q corresponding to the $k^{th}$ subcarrier for user 1 (STA1) and user 2 (STA2), respectively. $D_{k,1}$ and $D_{k,2}$ are diagonal phase shift matrices corresponding to the CSD effect at the $k^{th}$ subcarrier for user 1 and user 2, respectively. $D_{k,1}$ is a CSD matrix with diagonal entries that depend on (CSD(0), CSD(1), . . . , and CSD($N_{sts}^{u1}$)). $D_{k,2}$ is a CSD matrix with diagonal entries that depend on (CSD(0), CSD(1), . . . , and CSD($N_{sts}^{u2}$)). The diagonal entries are a function of the CSD(n) and the tone index k. $P_{1*}$ and $P_{2*}$ denote first and second rows of a VHTLTF mapping matrix (P matrix).

According to a second approach, the users (i.e., the STAs) are ordered in a predetermined manner by the base station (BS), where the order is communicated to the STAs, and the CSDs are applied to all the streams as if all the streams belong to a single user. That is, the CSD values are not reset across users. For example, suppose there are two users (STA1 and STA2), and four streams (S1, S2, S3, and S4). For the user STA1, a CSD value CSD1 is applied to stream S1, and a CSD value CSD2 is applied to stream S2. Subsequently, for the user STA2, a CSD value CSD3 is applied to stream S3, and a CSD value CSD4 is applied to stream S4.

Mathematically, considering the same example in the first approach, the VHTLTFs on the $k^{th}$ subcarrier can be expressed as $$VHTLTF_k = [L_{k,1}, L_{k,2}, \ldots , L_{k,N_{LTF}}] = [Q_{k,1}, Q_{k,2}]D_k\begin{bmatrix} P_{1*} \\ P_{2*} \end{bmatrix}s^{(k)}$$

where $D_k$ is a CSD matrix with diagonal entries that depend on (CSD(0), CSD(1), . . . , and CSD($N_{sts}^{u1}+N_{sts}^{u2}$)). The diagonal entries are a function of the CSD(n) and the tone index k. In other words, in the second approach, the CSD values are applied assuming a single user with extended number of streams.

Figures 3A, 3B:
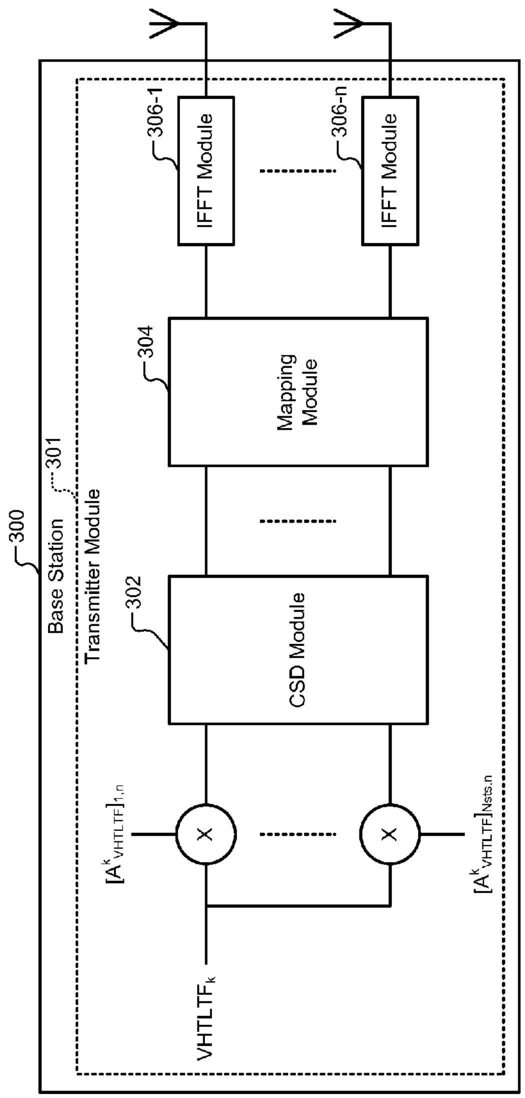
FIG. 3A is a functional block diagram of a transmitter of a base station (BS) according to the present disclosure.
FIG. 3B depicts a table showing a number of very high throughput long training fields (VHTLTFs) required for different number of space-time streams in a multi-user (MU) packet according to the present disclosure.

Referring now to FIGS. 3A-3C, transmission of VHT long training fields (VHTLTFs) and application of cyclic shift delays (CSDs) according to the present disclosure are described in further detail. In FIG. 3A, a base station 300 includes a transmitter module 301 that generates VHTLTFs and applies CSDs according to the present disclosure. The transmitter module 301 includes a CSD module 302, a mapping module 304, and a plurality of inverse fast Fourier transform (IFFT) modules 306-1, . . . , **306-*n* (collectively IFFT modules 306**), where n is an integer greater than 1.

The CSD module 302 applies CSDs to the space-time streams according to the first approach or the second approach described above. The mapping module 304 applies a spatial mapping matrix $[Q_k]_{Nsts}$ to the outputs of the CSD module 302. The IFFT modules 306 apply inverse fast Fourier transform to the outputs of the mapping module 304. The outputs of the IFFT modules 306 are transmitted via transmit antennas of the base station 300.

The VHTLTFs are used by the STAs to estimate the MIMO channel. The base station 300 provides training for the space-time streams (inputs of the mapping module 304) used to transmit a packet. All VHT transmissions have a preamble that includes a single section of VHTLTFs, where data tones of each VHTLTF are multiplied by entries belonging to a matrix P to allow channel estimation at the STA, and where pilot tones of each VHTLTF are multiplied by entries of a matrix R. For example, the multiplication shown in FIG. 3A can be mathematically expressed as follows.

$$A^k_{VHTLTF} = \begin{cases} R_{VHTLTF}, & \text{if } k \in K_{Pilot} \\ P_{VHTLTF}, & \text{otherwise} \end{cases}$$

$$[R_{VHTLTF}]_{m,n} = [P_{VHTLTF}]_{1,n}, \text{ where } 1 \le m, n \le N_{VHTLTF}.$$

The multiplication of the pilot tones in the VHTLTF symbol by the R matrix instead of the P matrix allows STAs to track phase and frequency offset during MIMO channel estimation using the VHTLTF.

The number of resolvable VHTLTF symbols ($N_{VHTLTF}$) is a function of the total number of space-time streams across all users, $N_{STS,total}$. For example, in FIG. 3B, a table of number of VHTLTFs required for different number of space-time streams in a multi-user (MU) packet is shown. Accordingly, a single section of VHTLTFs can include one, two, four, six or eight VHTLTFs necessary for demodulation of the VHT data portion of the PPDU or for channel estimation.

In FIG. 3C, a table of cyclic shift delay values for the VHT portion of a multi-user (MU) packet is shown. Throughout the VHT portion of the VHT format preamble, the cyclic shift delay is applied to prevent beamforming when similar signals are transmitted in different space-time streams. The same cyclic shift delay is applied to these streams during transmission of the data portion (i.e., payload) of the frame. The cyclic shift delay value $T_{CS,VHT}(n)$ for the portion of the MU packet following VHT-SIG-A for space-time stream n out of $N_{STS,total}$ total space-time streams is shown in FIG. 3C. For example, in a MU packet, using the second approach, the cyclic shift delay values are applied continuously (i.e., without resetting when moving from one user to another) across the space-time streams as shown in FIG. 3C.

Figure 4:
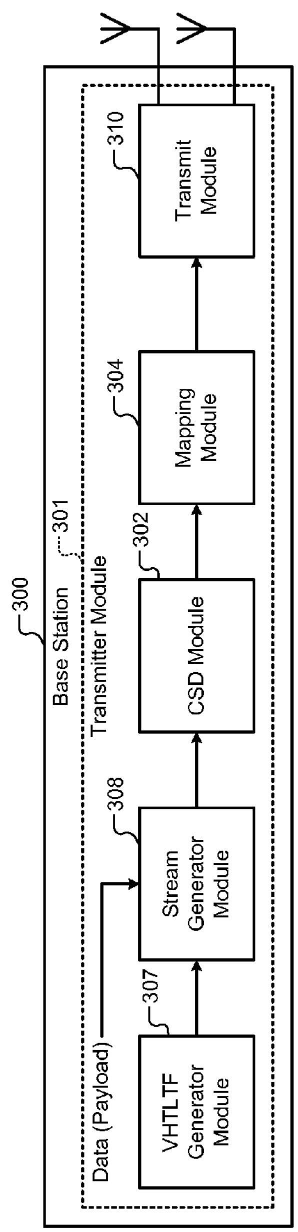
FIG. 4 is a functional block diagram of a transmitter of a base station (BS) according to the present disclosure.

Referring now to FIG. 4, the base station 300 according to the present disclosure is shown in further detail. Specifically, the transmitter module 301 further includes a VHTLTF generator module 307, a VHT data streams generator module 308, and a transmit module 310. The VHTLTF generator module 307 generates a plurality of resolvable VHTLTFs to be transmitted in a multi-user (MU) packet to a plurality of client stations. For example only, suppose that the base station 300 transmits data to two client stations: a first client station and a second client station. Each of the client stations receives all of the resolvable VHTLTFs in the space-time streams that are designated for each client station. Receiving all of the resolvable VHTLTFs allows each client station to obtain knowledge of channel across all the space-time streams and to suppress interference based on the knowledge. The total number of resolvable VHTLTFs is a function of the total number of space-time streams transmitted in the MU packet. For example only, the total number of resolvable VHTLTFs transmitted to each client station is equal to the total number of space-time streams transmitted to all client stations in the MU packet.

The VHT data streams generator module 308 generates a plurality of space-time streams to be transmitted in the MU packet to the client stations. The VHT data streams generator module 308 generates the space-time streams based on the resolvable VHTLTFs and the data (i.e., payload) to be transmitted to the client stations. For example only, a first set of space-time streams can be designated for transmission to the first client station and can include the plurality of resolvable VHTLTFs. For example only, a second set of space-time streams can be designated for transmission to the second client station and can include the plurality of resolvable VHTLTFs.

The CSD module 302 applies a plurality of cyclic shift delay values to the plurality of space-time streams. For example only, first values from the plurality of cyclic shift delay values are respectively applied to the first space-time streams designated for the first client station. For example only, second values from the plurality of cyclic shift delay values are respectively applied to the second space-time streams designated for the second client station. The cyclic shift delay module applies the cyclic shift delay values to the space-time streams transparently (i.e., irrespective of the actual values of the cyclic shift delay values).

When the first approach for applying the CSD values is used, at least one of the second values is equal to one of the first values since the second values are obtained by resetting the CSD values to the first values as explained above. When the second approach for applying the CSD values is used, the second values are different than the first values since the CSD values are not reset when moving from one client station to another as explained above.

The mapping module 304 spatially maps the plurality of space-time streams by applying a Q matrix to the space-time streams. The mapping module 304 spatially maps the plurality of space-time streams after the CSD module 302 applies the cyclic shift delay values to the plurality of space-time streams. The transmit module 310 transmits a MU packet comprising the space-time streams spatially separated by the CSDs to the client stations via a plurality of transmit antennas.

The MU packet includes a data portion that includes data (i.e., payload) to be transmitted to the client stations and a preamble portion that includes the plurality of resolvable VHTLTFs. The CSD module 302 applies the cyclic shift delay values to the data portion consistently with the cyclic shift delay values applied to the preamble portion.

Figure 5:
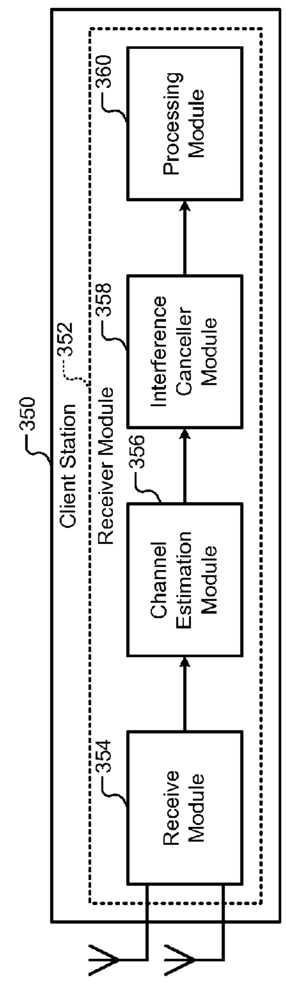
FIG. 5 is a functional block diagram of a receiver of a client station (STA) according to the present disclosure.

Referring now to FIG. 5, a client station 350 according to the present disclosure is shown. The client station 350 includes a receiver module 352. The receiver module 352 includes a receive module 354, a channel estimation module 356, an interference canceller module 358, and a processing module 360. The receive module 354 receives the MU packet transmitted by the base station 300 via a plurality of receive antennas.

Based on the plurality of resolvable VHTLTFs received in the first space-time streams designated for the client station 350, the channel estimation module 356 generates a first channel estimate for the first space-time streams designated for the client station 350. Additionally, based on the plurality of resolvable VHTLTFs received in the first space-time streams, the channel estimation module 356 generates a second channel estimate for the second space-time streams that are not designated for the client station 350. Thus, the client station 350 obtains knowledge of channel across all the space-time streams.

Based on the knowledge of channel across all the space-time streams, the interference canceller module 358 suppresses interference caused by the space-time streams that are received by the receive module 354 and that are not designated for the client station 350. The processing module 360 processes the first space-time streams that are designated for the client station 350 based on the channel estimate for the first space-time streams.

Figures 6, 7:
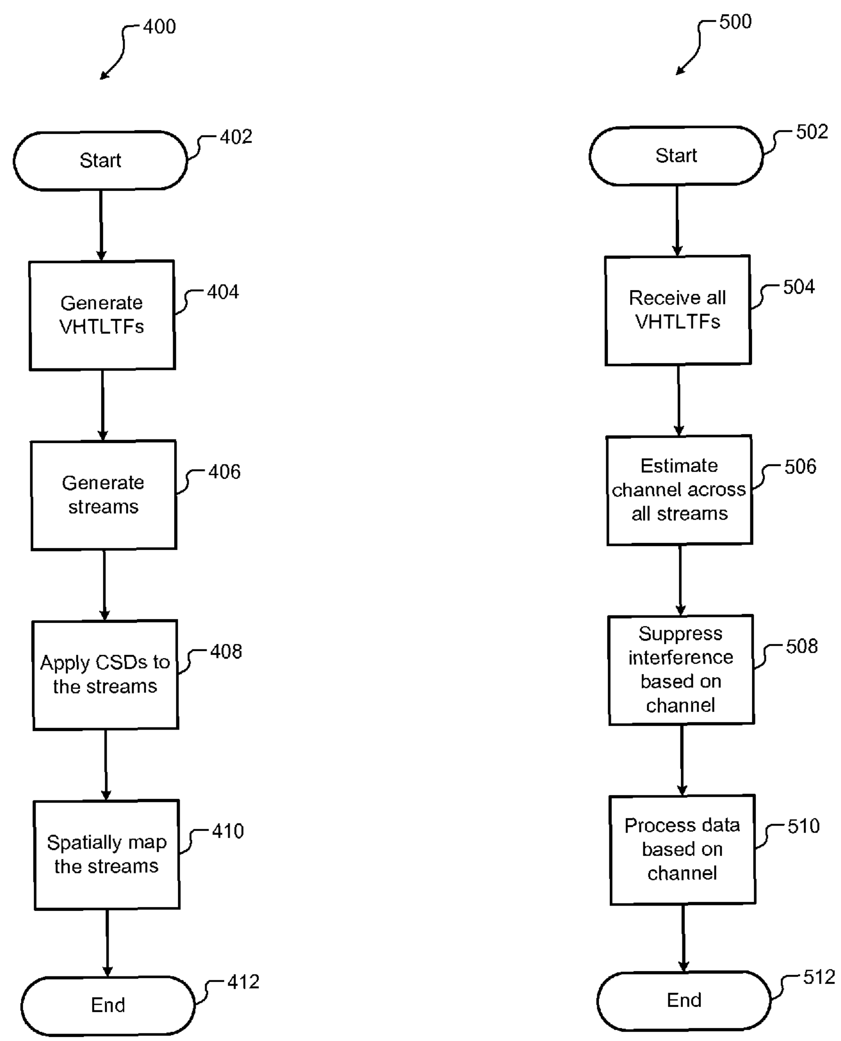
FIG. 6 is a flowchart of a method for applying cyclic shift delay values to space-time streams in a multi-user (MU) packet transmitted from a base station (BS) to a plurality of client stations (STAs) according to the present disclosure.
FIG. 7 is a flowchart of a method for suppressing interference at a client station according to the present disclosure.

Referring now to FIG. 6, a method 400 for applying cyclic shift delay values to space-time VHT data streams in a multi-user (MU) packet transmitted in a downlink transmission is shown. Control begins at 402. At 404, control generates resolvable VHTLTFs to be transmitted in a multi-user (MU) packet to a plurality of client stations (e.g., two client stations: a first client station and a second client station). At 406, control generates a plurality of space-time VHT data streams to be transmitted in the MU packet to the client stations based on the resolvable VHTLTFs and the data (i.e., payload) to be transmitted to the client stations. For example only, a first set of space-time VHT data streams can be designated for transmission to the first client station and can include the plurality of resolvable VHTLTFs. For example only, a second set of space-time VHT data streams can be designated for transmission to the second client station and can include the plurality of resolvable VHTLTFs.

At 408, control applies a plurality of cyclic shift delay values to the plurality of space-time VHT data streams. For example only, first values from the plurality of cyclic shift delay values are respectively applied to the first space-time VHT data streams designated for the first client station. For example only, second values from the plurality of cyclic shift delay values are respectively applied to the second space-time VHT data streams designated for the second client station. Control applies the cyclic shift delay values to the space-time VHT data streams transparently (i.e., without regard to the actual values of the cyclic shift delay values).

Further, at 408, when the first approach for applying the CSD values is used, control selects at least one of the second values equal to one of the first values since control obtains the second values by resetting the CSD values to the first values as explained above. When the second approach for applying the CSD values is used, control selects the second values that are different than the first values since control does not reset the CSD values when moving from one client station to another as explained above. The MU packet includes a data portion that includes data (i.e., payload) to be transmitted to the client stations and a preamble portion that includes the plurality of resolvable VHTLTFs. In either approach, control applies the cyclic shift delay values to the data portion consistently with the cyclic shift delay values applied to the VHTLTFs.

At 410, control spatially maps the plurality of space-time VHT data streams by applying a Q matrix to the space-time VHT data streams after the cyclic shift delay values are applied to the plurality of space-time VHT data streams. Control transmits a MU packet comprising the space-time VHT data streams spatially separated by the CSDs to the client stations via a plurality of transmit antennas. Control ends at 412.

Referring now to FIG. 7, a method 500 for suppressing interference at a client station according to the present disclosure is shown. Control begins at 502. At 504, control receives a multi-user (MU) packet. The client station receives all of the resolvable VHTLTFs in first space-time streams that are designated for the client station, which allows the client station to obtain knowledge of channel across all the space-time streams and to suppress interference based on the knowledge.

At 506, based on the plurality of resolvable VHTLTFs received in the first space-time streams that are designated for the client station, control generates a first channel estimate for the first space-time streams that are designated for the client station. Additionally, based on the plurality of resolvable VHTLTFs received in the first space-time streams, control generates a second channel estimate for the second space-time streams that are not designated for the client station. Thus, the client station obtains knowledge of channel across all the space-time streams.

At 508, based on the knowledge of channel across all the space-time streams, control suppresses interference caused by the space-time streams that are received by the client station and that are not designated for the client station. At 510, control processes the first space-time streams that are designated for the client station based on the channel estimate for the first space-time streams, and control ends at 512.

The description herein is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:

a stream generator module configured to generate a plurality of streams to be transmitted in a packet, wherein the packet is to be transmitted to a plurality of client stations, wherein first streams of the plurality of streams (i) are designated for a first client station of the plurality of client stations and (ii) include a plurality of training fields, and wherein second streams of the plurality of streams (i) are designated for a second client station of the plurality of client stations and (ii) include the plurality of training fields;

a cyclic shift delay module configured to apply a plurality of cyclic shift delay values to the plurality of streams, wherein first values from the plurality of cyclic shift delay values are respectively applied to the first streams, wherein second values from the plurality of cyclic shift delay values are respectively applied to the second streams, and wherein the second values are different than the first values; and a mapping module configured to spatially map the plurality of streams subsequent to the cyclic shift delay module applying the cyclic shift delay values to the plurality of streams.

2. The system of claim 1, further comprising a training field generator module configured to generate the plurality of training fields to be transmitted in the packet to the plurality of client stations.

3. The system of claim 1, wherein a total number of training fields in the plurality of training fields is a function of a total number of streams in the plurality of streams.

4. The system of claim 1, wherein a total number of training fields transmitted to each of the plurality of client stations is equal to a total number of streams in the plurality of streams.

5. The system of claim 1, wherein the packet includes (i) a preamble portion that includes the plurality of training fields and (ii) a data portion that includes data for the plurality of client stations, and wherein the cyclic shift delay module is configured to apply the cyclic shift delay values to (i) the data portion and (ii) the preamble portion.

6. The system of claim 1, wherein the cyclic shift delay module is configured to apply the cyclic shift delay values to the plurality of streams independently of actual values of the cyclic shift delay values.

7. The system of claim 1, further comprising a transmit module configured to transmit the packet to the plurality of client stations via a plurality of antennas.

8. The system of claim 1, further comprising the first client station, wherein the first client station is configured to:

generate, based on the plurality of training fields, (i) a first channel estimate for the first streams and (ii) a second channel estimate for the second streams; and suppress interference due to the second streams based on (i) first channel estimate and (ii) the second channel estimate.

9. A base station comprising the system of claim 1.

10. A method comprising:

generating a plurality of streams to be transmitted in a packet, wherein the packet is to be transmitted to a plurality of client stations, wherein first streams of the plurality of streams (i) are designated for a first client station of the plurality of client stations and (ii) include a plurality of training fields, and wherein second streams of the plurality of streams (i) are designated for a second client station of the plurality of client stations and (ii) include the plurality of training fields;

applying a plurality of cyclic shift delay values to the plurality of streams, wherein first values from the plurality of cyclic shift delay values are respectively applied to the first streams, wherein second values from the plurality of cyclic shift delay values are respectively applied to the second streams, and wherein the second values are different than the first values; and mapping the plurality of streams subsequent to applying the cyclic shift delay values to the plurality of streams.

11. The method of claim 10, further comprising generating the plurality of training fields to be transmitted in the packet to the plurality of client stations.

12. The method of claim 10, wherein a total number of training fields in the plurality of training fields is a function of a total number of streams in the plurality of streams.

13. The method of claim 10, wherein a total number of training fields transmitted to each of the plurality of client stations is equal to a total number of streams in the plurality of streams.

14. The method of claim 10, wherein the packet includes (i) a preamble portion that includes the plurality of training fields and (ii) a data portion that includes data for the plurality of client stations, and wherein applying the cyclic shift delay values to the plurality of streams includes applying the cyclic shift delay values to (i) the data portion and (ii) the preamble portion.

15. The method of claim 10, wherein applying the cyclic shift delay values to the plurality of streams includes applying the cyclic shift delay values to the plurality of streams independently of actual values of the cyclic shift delay values.

16. The method of claim 10, further comprising transmitting the packet to the plurality of client stations via a plurality of antennas.

17. The method of claim 10, further comprising transmitting the plurality of streams in the packet from a base station.

18. The method of claim 10, further comprising, at the first client station:

generating, based on the plurality of training fields, (i) a first channel estimate for the first streams and (ii) a second channel estimate for the second streams; and suppressing interference due to the second streams based on (i) first channel estimate and (ii) the second channel estimate.

* * * * *